J. H. STANFIELD.
CHERRY SEEDER OR PITTER.
APPLICATION FILED DEC. 30, 1910.

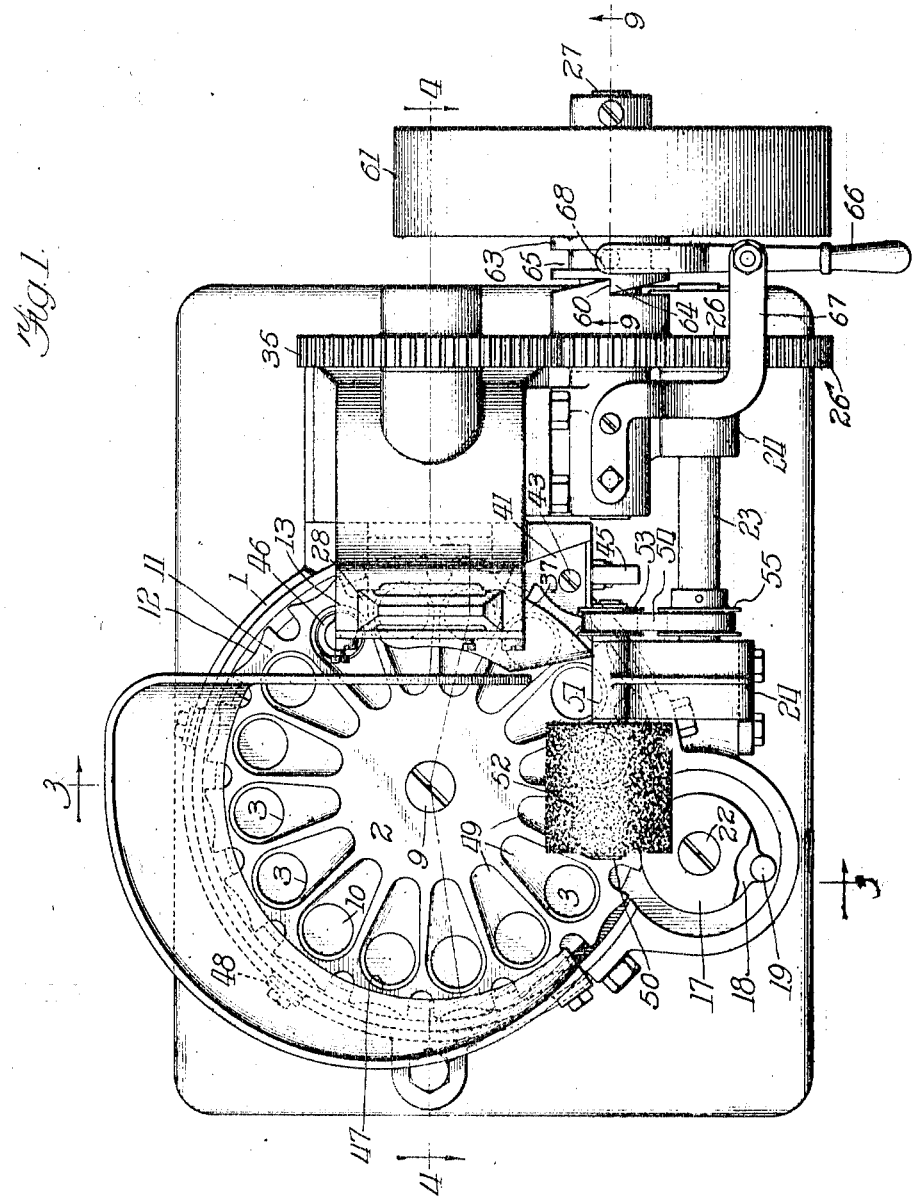

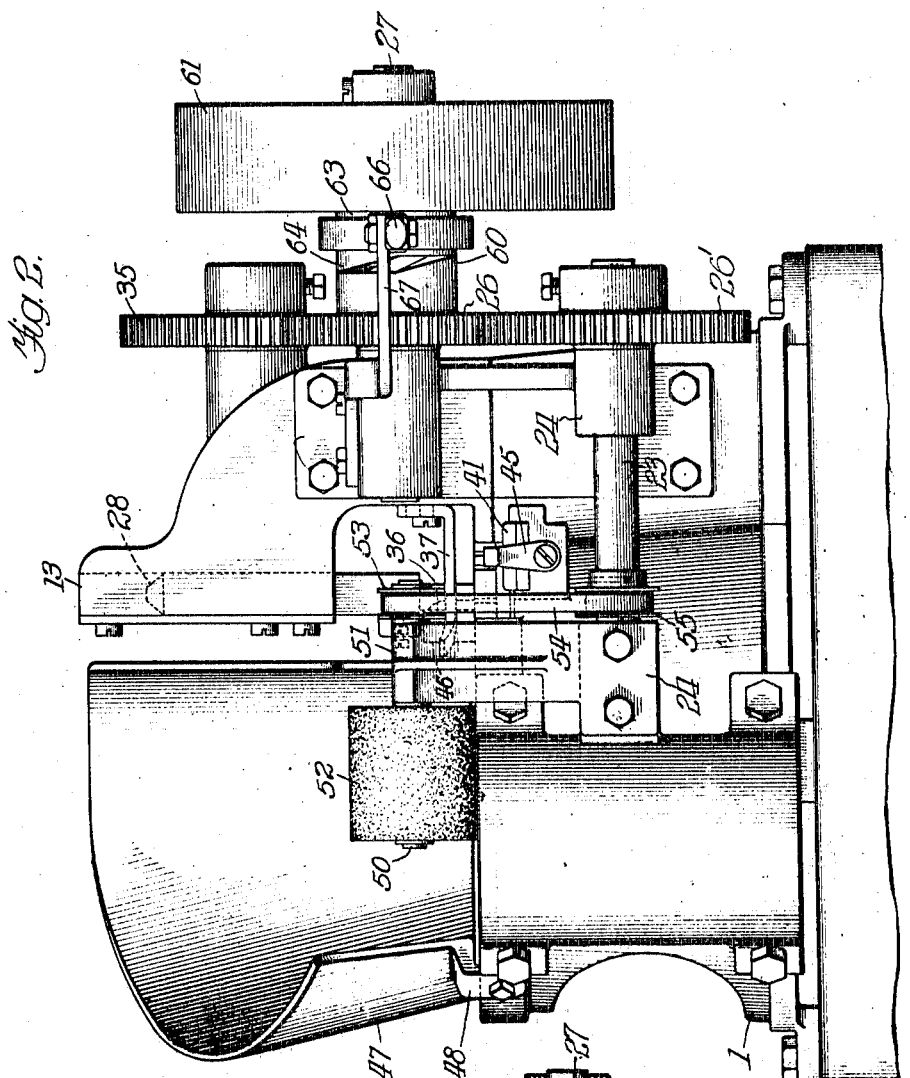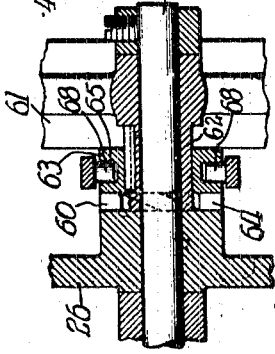

1,105,858.

Patented Aug. 4, 1914.
5 SHEETS—SHEET 3.

Witnesses:
Robert N. Weir
Blanche Chalmers.

Inventor:
Jasper H. Stanfield
By Burton U. Niff
Atty.

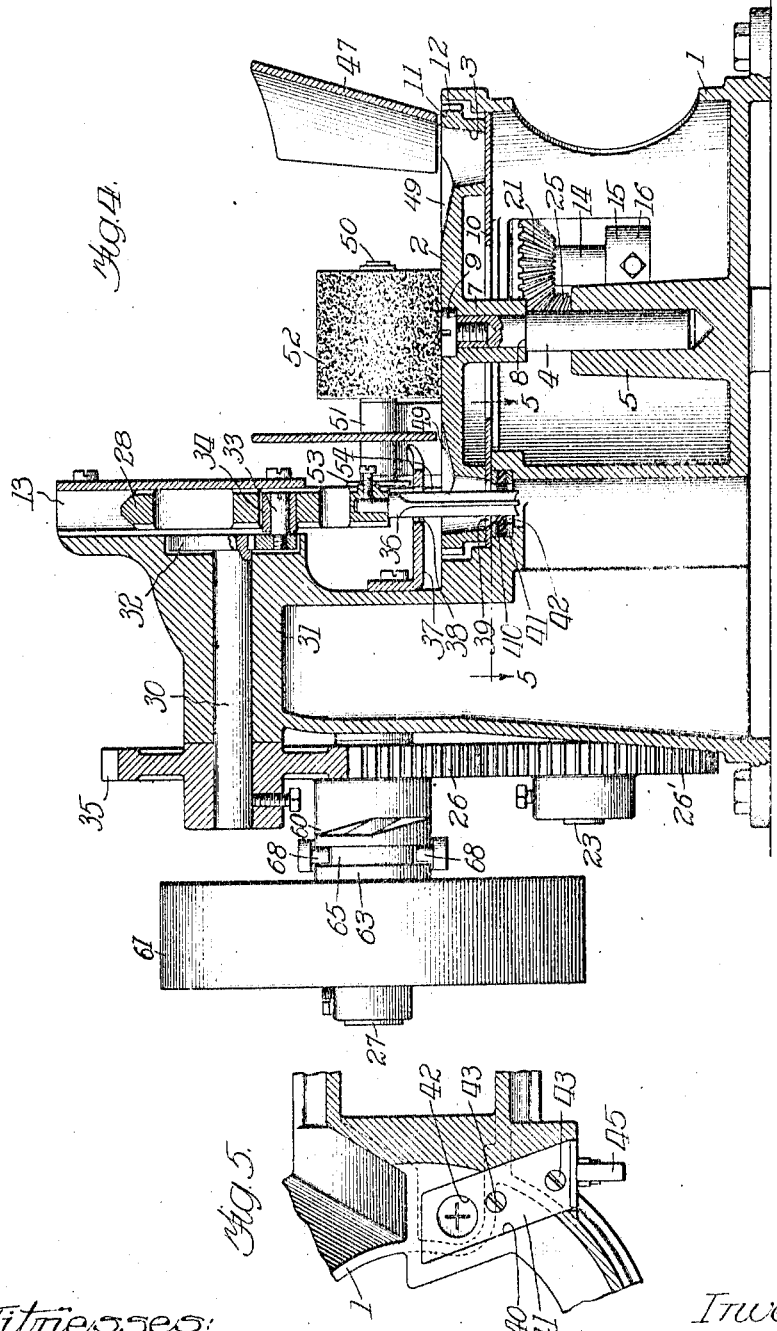

J. H. STANFIELD.
CHERRY SEEDER OR PITTER.
APPLICATION FILED DEC. 30, 1910.

1,105,858.

Patented Aug. 4, 1914.
5 SHEETS—SHEET 5.

Witnesses:
Robert N. Weir
Blanche Chalmers

Inventor
Jasper H. Stanfield
By Burton & Ville
Atty.

UNITED STATES PATENT OFFICE.

JASPER H. STANFIELD, OF MUSKEGON, MICHIGAN, ASSIGNOR OF ONE-HALF TO MICHIGAN WASHING MACHINE COMPANY, OF MUSKEGON HEIGHTS, MICHIGAN, AND ONE-FOURTH TO WILLIAM H. BOZELL, OF MUSKEGON, MICHIGAN.

CHERRY SEEDER OR PITTER.

1,105,858.     Specification of Letters Patent.     Patented Aug. 4, 1914.

Application filed December 30, 1910. Serial No. 600,202.

*To all whom it may concern:*

Be it known that I, JASPER H. STANFIELD, a citizen of the United States, residing at Muskegon, in the county of Muskegon and State of Michigan, have invented certain new and useful Improvements in Cherry Seeders or Pitters, of which the following is a description.

My invention relates to mechanism for removing the seeds or pits from cherries or similar fruit.

The object of my invention is to provide a simple, effective and efficient device of the kind described adapted to remove the seeds or pits from cherries or similar fruit without seriously marring or injuring the appearance of the fruit.

To this end my invention consists in the novel construction, arrangement and combination of parts herein shown and described and more particularly pointed out in the claims.

Figure 3:
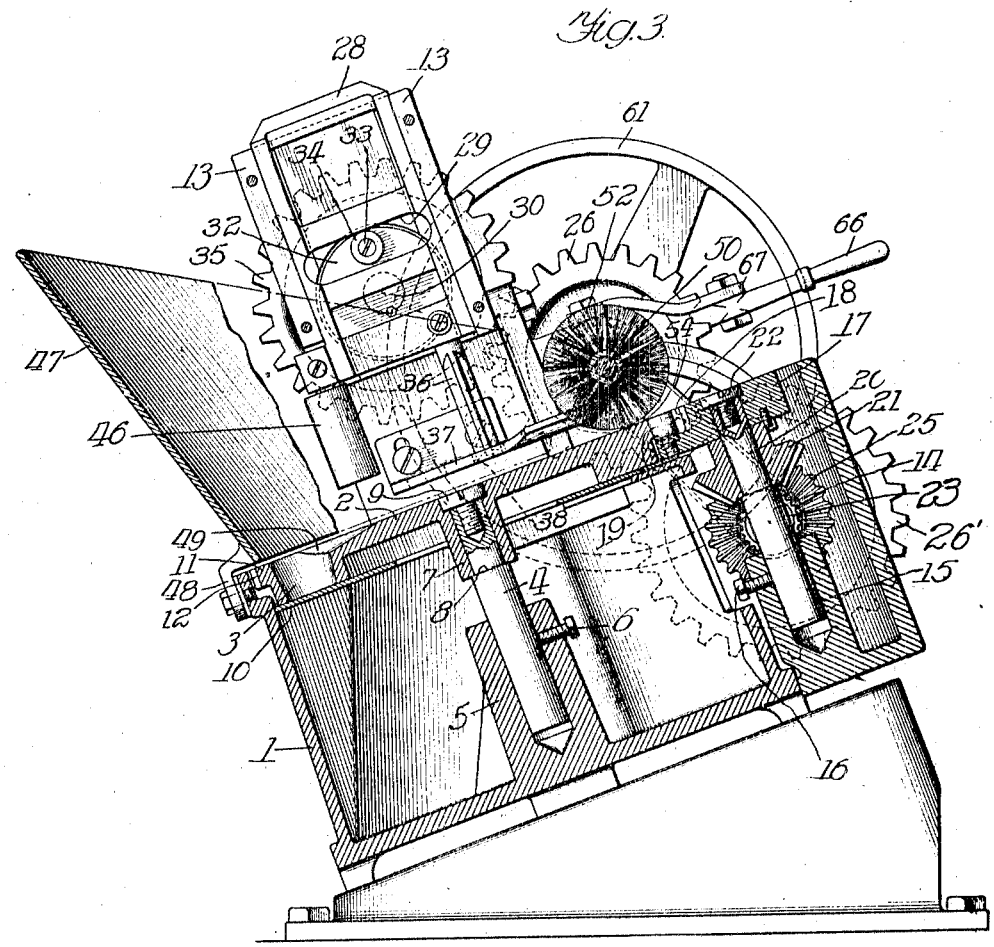
Figure 6:
Figure 7:
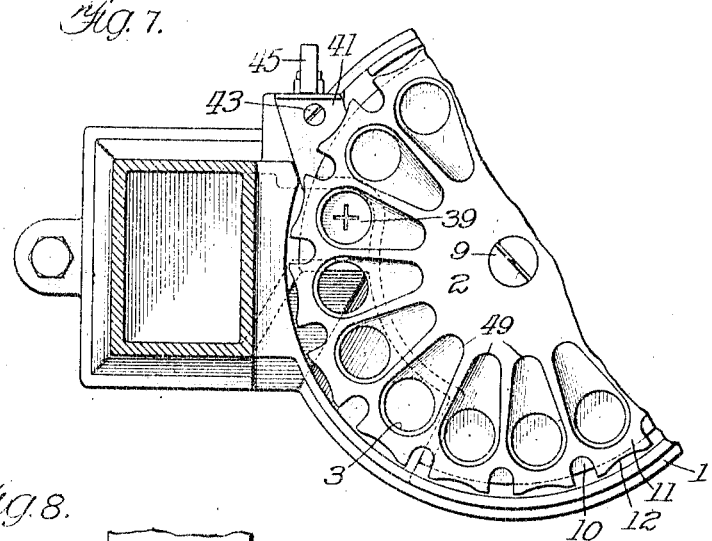
Figure 8:
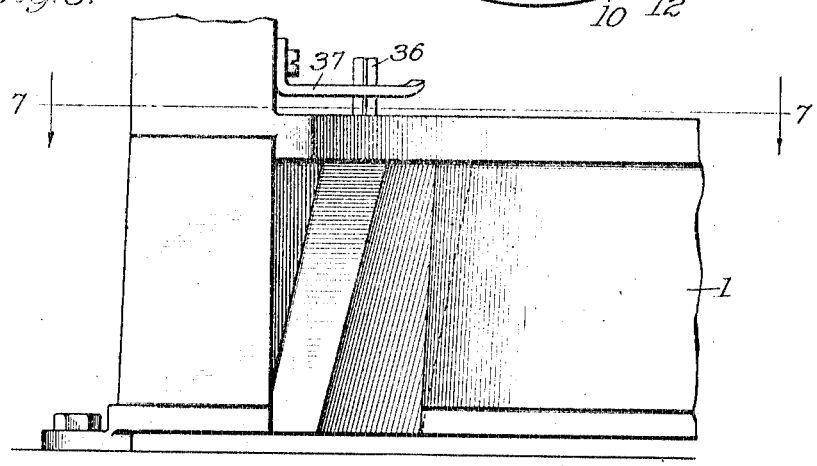
Figure 9:
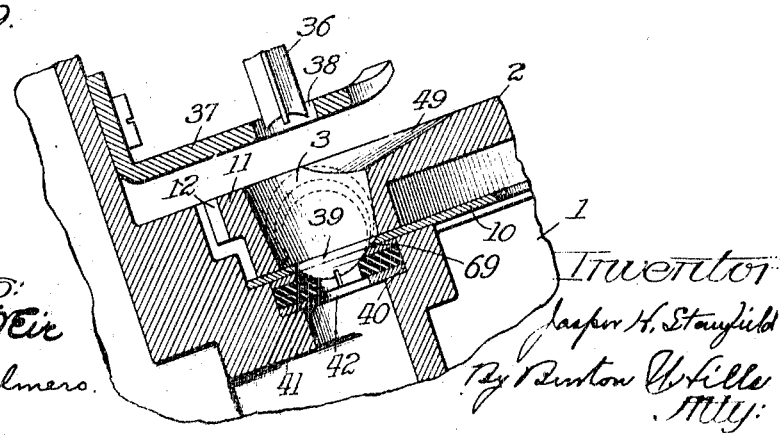

In the accompanying drawings wherein like or similar reference characters indicate like or corresponding parts: Figure 1 is a plan view of my machine. Fig. 2 is a side elevation of the same. Fig. 3 is a section taken substantially on line 3—3 of Fig. 1. Fig. 4 is a section taken substantially on line 4—4 of Fig. 1. Fig. 5 is a fragmentary sectional detail taken substantially on line 5—5 of Fig. 4. Fig. 6 is a perspective detail of the preferred form of pitting needle for my device. Fig. 7 is a section taken substantially on line 7—7 of Fig. 8. Fig. 8 is a side elevation of the lower portion of the frame of my device showing the discharge chute for the pitted fruit. Fig. 9 is an enlarged fragmentary sectional detail taken substantially on the same line as Fig. 4. Fig. 10 is a sectional detail taken substantially on line 9—9 of Fig. 1.

In the preferred form shown in the drawings my device consists of a frame 1 of any desired form or construction provided with a movable circular cell plate 2 having a plurality of apertures 3—3 near its periphery evenly spaced from each other and each tapering slightly toward the lower side of the plate. The cell plate 2 may be mounted upon the frame 1 in any suitable manner. As shown a shaft 4 is rigidly mounted in a suitable socket or bearing 5 upon the frame and rigidly held in the socket by a set-screw 6 or other suitable means extending through the wall of the socket and adapted to engage the shaft and hold it in any desired position. The upper end of the shaft 4 is reduced in diameter sufficiently to enter the hub 7 of the plate 2 and is provided with a shoulder 8 adapted to engage the lower end of the hub 7 to serve as a bearing and support the plate in position. In the preferred construction the central opening in the plate 2 is counterbored at the upper side of the plate and a cap-screw 9 is provided having a head of suitable size to fit within the counterbore. The screw 9 is positioned in a longitudinal opening in the end of the shaft 4 and coöperates with the shoulder 8 to accurately control the position of the plate upon the shaft.

In the preferred construction a guard plate 10 is provided rigidly secured at its margins to the frame 1 and arranged in close proximity to the lower side of the plate 2 to close the lower ends of all of the openings 3 except approximately one-quarter of the openings where the guard 10 is deflected downward and serves as a spout to direct any cherries or fruit from the apertures 3 into a suitable receptacle as the apertures are successively brought into position over this portion of the guard.

Any suitable means may be provided for controlling the position and movements of the cell plate 2. In the preferred construction, a plurality of teeth 11 are provided at the periphery of the cell plate, one for each aperture 3. The outer end of each tooth is concave as at 12. A shaft 14 is mounted in a suitable bearing or socket 15 upon the frame 1 and secured in position in the socket by a set-screw 16 or other suitable means. A cylindrical cam 17 of suitable size to snugly fit the concave portions in the teeth 11 to lock the plate 2 in position is rotatably mounted upon the upper end of the shaft 14. A part at one side of the cam 17 is cut away as at 18 and a tooth 19 is provided near the center of the cut away portion, so that as the cam 17 is rotated the tooth 19 will successively engage the sides of the teeth 11 and move the plate 2 a single space for each rotation of the cam. After each movement of the plate 2 the cylindrical portion of the cam 17 will engage the concave part 12 of the next tooth and again positively lock the plate 1 in position until the tooth 19 again arrives in position to engage the side of a tooth 11. This arrangement which is an adaptation of the well known Geneva movement positively controls the position of the plate at all times and prevents the possibility of any failure to properly position the plate. Any suitable means may be provided to rotate the cam 17. In the form shown the upper end of the shaft 14 is slightly reduced in size as at 20 and a bevel gear 21 is mounted upon the reduced portion of the shaft and rigidly secured to the cam 17. The upper face of the cam 17 is counterbored and a cap-screw 22 having a head of suitable size to fit within the counter bore of the cam is fitted in a longitudinal opening in the end of the shaft 14 to prevent longitudinal movement of the cam and gear 21.

A shaft 23 is rotatably mounted in suitable bearings 24—24 on the frame 1, and a beveled gear 25 adapted to coöperate with the bevel gear 21 is rigidly mounted upon the shaft 23. A spur gear 26' is provided at the opposite end of the shaft 23 adapted to coöperate with a spur gear 26 upon a shaft 27 suitably mounted upon the frame 1 substantially parallel to the shaft 23 so that a movement of the spur gear 26 will produce a corresponding movement of the cam 17 and the cell plate 2. The several parts are so constructed and arranged that the apertures 3 in the cell plate 2 are successively brought to a certain fixed position where suitable mechanism is provided to extract the pit or seed from the cherry or similar fruit positioned in each aperture. Any suitable pitting or seeding mechanism may be provided for this purpose. In the form shown a pair of guides 13—13 are provided at substantially right angles to the face of the cell plate 2 with a slide 28 mounted between the guides and adapted to move longitudinally thereof.

A crank shaft 30 is rotatably mounted in a suitable bearing 31 in the frame 1 with a disk 32 rigidly secured to the end of the shaft adjacent to the slide 28. A crank pin 33 is provided upon the disk 32 carrying a roller 34 of suitable size to enter a transverse slot 29 in the slide so that when the shaft 30 is rotated the desired movement will be imparted to the slide 28. The opposite end of the shaft 30 is provided with a gear wheel 35 arranged to mesh and coöperate with the gear 26 upon the shaft 27. A pitting needle 36 is positioned substantially parallel to the guides 13 and rigidly secured to the slide 28. In the preferred construction the pitting needle is of cross shaped section with the free end of the needle concave, so that when the needle is thrust in a cherry or other fruit the engagement of the working face of the needle with the surface of the fruit or with the pit or seed will tend to center the fruit upon the needle and thereby secure the desired operation of the device. The several parts are so constructed and arranged that when the shaft 27 is rotated the apertures upon the cell plate will be successively brought into the path of the pitting needle when the needle is near the upper limit of its movement. The plate will then be held in position during the downward movement of the pitting needle which passes centrally through an aperture until its free end extends slightly below the plate 10 and is retracted to clear the cell plate. During the remainder of the upward movement of the pitting needle the cell plate is moved to bring the next aperture into position in the path of the pitting needle. In the preferred construction to prevent the fruit from remaining on the pitting needle and being lifted out of the aperture an upper guard plate 37 is rigidly and adjustably secured to the frame 1 substantially parallel to the lower guard 10, positioned to cover the upper end of the apertures in the cell plate 2 at the pitting needle. An opening 38 is provided in the upper guard 37 substantially in line with the opening in the lower guard 10 through which the free end of the pitting needle protrudes when the slide 27 is at the lower limit of its movement. Any suitable means may be provided to support the underside of the fruit and prevent any portion of the fruit being torn away and forced through the opening 39 in the plate 10. In the form shown a channel or slot 40 is provided in the frame 1 substantially parallel to the guard 10 and immediately beneath it.

A slide 41 is snugly fitted to the channel 40 and provided with an opening 42 arranged to register with the opening 39. The slide 41 is preferably provided with a lateral slot or if preferred may be formed in two parts connected by screws or bolts 43 as shown in Fig. 5 with a piece of rubber or resilient material positioned intermediate its top and bottom surface 42 so that the entire under surface of any fruit positioned in an aperture in line with the pitting needle will be supported by the resilient material which is preferably provided with a pair of slits at right angles to each other forming a cross adapted to permit the pitting needle to be forced through the material but preventing any of the fruit from passing through.

In the preferred construction one end of the slide 41 is arranged to engage a permanent stop at the end of the channel 40 and a latch 45 is provided to engage the opposite end of the slide to rigidly hold the slide in position with the opening therein accurately registering with the opening 39 in the lower guard 10.

In the preferred construction a plunger 46 is also provided upon the slide 28 arranged to enter an aperture in the cell plate which has just passed the pitting mechanism at each downward movement of the slide 28. The face of the plunger 46 reaches a point slightly below the lower face of the cell plate at the limit of each downward movement, so that in case the fruit positioned in the aperture adheres for any cause to the walls of the aperture it will be detached at this point.

In the preferred construction the cell plate 2 serves as the bottom of a hopper or vessel for containing the fruit to be operated upon. As shown the side walls 47 of the vessel extend from a point in close proximity to the upper face of the cell plate upward and outward to form a hopper with a part 48 upon the wall 47 rigidly secured to the frame 1 to hold the wall in position.

The wall 47 is so formed and positioned that the apertures 3 for a portion of each rotation are positioned within the wall so that any fruit within the hopper will fall by gravity into the several apertures. It is however desirable to permit but one cherry or other article to enter an aperture and to remain therein until the aperture passes the pitting needle. For this purpose the frame 1 of my machine is so formed that the surface of the cell plate 2 is inclined at an angle of approximately 20 degrees and a radial depression 49 is formed in the upper face of the cell plate for each aperture 3. The depressions 49 each increase in depth outward and terminate at one of the apertures leaving sufficient thickness at the inner wall of the aperture to retain a single cherry in the aperture, but leaving a suitable channel for any other cherries in the aperture to escape and roll down to the low side of the hopper. In practice this arrangement has been found very efficient and practically prevents all difficulty from this cause, but where it is desired to still further provide for removing surplus fruit from the apertures a shaft 50 is mounted in a suitable bearing 51 rigidly attached to the frame 1 with a brush 52 in position to sweep the upper side of the plate 2 and force any surplus cherries out of the apertures toward the center of the plate. The opposite end of the shaft 50 is provided with a sheave or pulley 53 connected by a belt or band 54 to a pulley 55 upon the shaft 23 so that rotations of the shaft 23 will correspondingly rotate the brush 52 as described.

Any suitable means may be provided for rotating the gear 26. In the preferred construction the shaft 27 is rigidly mounted upon the frame 1 and the gear 26 is rotatably mounted thereon and provided with an extended hub having a plurality of teeth or dentils 60 formed upon its outer end. A belt wheel 61 is also rotatably mounted upon the shaft 27 and provided with an extended hub 62 having a longitudinally movable head 63 mounted thereon and arranged to rotate therewith, while the outer face of the head 63 is provided with a plurality of teeth or dentils 64 adapted to coöperate with the teeth 60 upon the gear 26 so that when the head 63 is moved into engaging position, a rotation of the wheel 61 will produce a corresponding rotation of the gear 26. Suitable means are preferably provided for controlling the longitudinal position of the head 63, in the form shown a groove 65 is formed in the head and a bifurcated lever 66 is pivotally mounted upon a bracket 67 upon the frame 1. The forked end of the lever 66 is arranged to receive the head 63 between the forked parts which are preferably provided with suitable pins 68 or other convenient means extending into the groove 65 to control the position of the head, the whole arrangement constituting the well known jaw clutch for detachably connecting the pulley and gear. Obviously with my device as above described, fruit of a suitable size to fairly fill the several apertures 3 will be satisfactorily operated upon as any fruit positioned in the apertures will be held in a central position by engagement with the walls of the aperture; where however, the fruit to be operated on is not of uniform size it is obvious that the small fruit will tend to roll to the lower side of the aperture and thus in some cases tend to interfere with the proper operation of the device by not properly centering with the pitting needle. In practice it has been found that the concave face of the pitting needle tends to obviate this difficulty. To make the operation of the device substantially certain however, I prefer to construct the several parts as shown in Fig. 8, so that fruit of any size will automatically center itself in the apertures before the pitting needle engages the same. Any suitable means may be provided for this purpose. As shown, the aperture 39 in the plate 10 and the opening 42 in the upper side of the slide 41 is countersunk as shown at 69 the angle of the countersink being preferably just sufficient to cause a cherry or other article in the aperture to roll to the center of the aperture, where it engages the opposite wall of the countersink thereby accurately centering the same.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described, a rotatable cell plate provided with a plurality of radial depressions in its face each terminating near the periphery of the plate in a tapering circular fruit receiving aperture extending through the plate, in combination with a pair of stationary guards adapted to substantially close a portion of said apertures, one positioned below and the other above said plate, and means adapted to control the position and movements of said plate.

2. In a device of the kind described, a rotatable cell plate provided with a plurality of radial depressions in its face each terminating near the periphery of the plate in a fruit receiving aperture extending through the plate, in combination with a pair of stationary guards, one positioned below and closing the lower ends of all but approximately one quarter of said apertures and the other positioned above and in close proximity to said cell plate, and means adapted to control the position and movements of said plate.

3. In a device of the kind described, an inclined rotatable cell plate provided with a plurality of radial depressions in its face each terminating near the periphery of the plate in an aperture extending through the plate, in combination with a pair of stationary guards adapted to substantially close both ends of a part of said aperture, one positioned below and the other above said cell plate, and means adapted to engage and remove from said apertures any object projecting above the surface of said cell plate, and means adapted to control the position and movements of said plate.

4. In a device of the kind described, a rotatable cell plate provided with a plurality of radial depressions in its face each terminating near the periphery of the plate in a fruit receiving aperture extending through the plate, in combination with a pair of stationary guards adapted to substantially close a portion of said apertures, one positioned below and the other above said cell plate and a rotatable brush adapted to engage and remove from said cells any object projecting above the surface of said cell plate, means for rotating said brush and means adapted to control the position and movements of said cell plate.

5. In a device of the kind described, a rotatable cell plate provided with a plurality of depressions in its face each increasing in depth outward and terminating near the periphery of the plate in a tapering circular aperture extending through the plate, in combination with a pair of stationary guards adapted to substantially close both ends of a part of said apertures, one positioned below and the other above said plate, and means adapted to control the position and movements of said plate.

6. In a device of the kind described, a rotatable cell plate provided with a plurality of depressions in its face each increasing in depth outward and terminating near the periphery of the plate in a tapering circular aperture extending through the plate, in combination with a pair of stationary guards adapted to substantially close both ends of a part of said apertures, one positioned below and closing the lower ends of all but approximately one-quarter of said apertures and the other positioned above said cell plate, and means adapted to control the position and movements of said plate.

7. In a device of the kind described, an inclined rotatable cell plate provided with a plurality of evenly spaced radial depressions in its face each terminating near the periphery of the plate in an aperture extending through the plate, in combination with a pair of stationary guards adapted to substantially close both ends of a part of said apertures one positioned below and closing the lower ends of all but approximately one-quarter of said apertures and the other positioned above said plate, and means adapted to control the position and movements of said plate.

8. In a device of the kind described, a rotatable cell plate provided with a plurality of radial depressions in its face each terminating near the periphery of the plate in a fruit receiving aperture extending through the plate, in combination with a pair of stationary guards adapted to substantially close a portion of said apertures one positioned below and the other above said cell plate, said guards being each provided with an opening arranged in transverse alinement with the opening in the other guard and with any of the apertures in said cell plate, and means adapted to control the position and movements of said plate.

9. In a device of the kind described, a movable inclined cell plate provided with a plurality of fruit receiving apertures therethrough, in combination with a pair of stationary guards adapted to substantially close both ends of a part of said apertures, one positioned below and the other above said cell plate, means adapted to continuously engage and positively control the position and movements of said plate and a pitting knife and plunger operating through the guard above said cell plate upon the fruit positioned in said aperture.

10. In a device of the kind described, a movable cell plate provided with a plurality of apertures therethrough, in combination with a pair of stationary guards, one positioned below and the other above said cell plate, said guards being each provided with an opening extending therethrough, arranged in transverse alinement with the opening in the other guard, the opening in the lower guard being counter-sunk, adjacent said cell plate, and means adapted to engage and control the position and movements of said plate.

11. In a device of the kind described, a movable cell plate provided with a plurality of apertures therethrough, in combination with a pair of stationary guards adapted to substantially close both ends of a part of said apertures, one positioned below and the other above said cell plate, said guards being each provided with an opening therethrough arranged in transverse alinement with the opening in the other guard, the opening in the lower guard plate being provided with a resilient closure adapted to yieldingly resist the passage of an object through the opening, and means adapted to control the position and movements of said cell plate.

12. In a device of the kind described, an inclined movable cell plate provided with a plurality of apertures therethrough, in combination with a pair of stationary guards adapted to substantially close both ends of a part of said apertures one positioned below and the other positioned above said cell plate said guards being each provided with an opening extending therethrough arranged in transverse alinement with the opening in the other guard the opening in the lower guard being counter-sunk adjacent the cell plate and provided with a resilient closure adapted to yieldingly resist the passage of an object therethrough, and means adapted to control the position and movements of said cell plate.

13. In a device of the kind described, a movable cell plate provided with a plurality of apertures therethrough, in combination with a pair of stationary guards adapted to substantially close both ends of a part of said apertures, one positioned below and the other above said cell plate, said guards being each provided with an opening extending therethrough arranged in transverse alinement with the opening in the other guard, and means upon the lower guard adapted to centralize a spherical body with the axis common to said openings.

14. In a device of the kind described, an inclined movable cell plate provided with a plurality of apertures therethrough, in combination with a pair of stationary guards adapted to substantially close both ends of a part of said apertures, one positioned below and the other above said cell plate, said guards being each provided with an opening extending therethrough arranged in transverse alinement with the opening in the other guard and means upon the lower guard to centralize a spherical body with the axis common to said openings.

15. In a device of the kind described, an inclined movable cell plate provided with a plurality of apertures extending therethrough, in combination with a pair of stationary guards adapted to substantially close both ends of a part of said apertures one positioned below and the other above said cell plate, said guards being each provided with an opening extending therethrough arranged in transverse alinement with the opening in the other guard, the opening in the lower guard being provided with a resilient closure adapted to yieldingly resist the passage of an object through the opening, and means upon said lower guard plate adapted to centralize a spherical body with the axis common to said openings.

16. In a device of the kind described, a movable cell plate provided with a plurality of apertures extending therethrough, in combination with a pair of stationary guards adapted to substantially close both ends of a part of said apertures one positioned below and the other above said cell plate, each guard being provided with an opening extending therethrough arranged in transverse alinement with the opening in the other guard, the opening in the lower guard being provided with a resilient closure extending across said opening intermediate its ends adapted to yieldingly resist the passage of an object through the opening, and means upon said guard adapted to automatically centralize a spherical body with the axis common to said openings.

17. In a pitting machine a disk shaped rotatable feed plate having a plurality of fruit receiving cells therein and a guard substantially closing the upper ends of a plurality of said cells in combination with a reciprocating member positioned above said guard, and a pitting knife and plunger attached to said member and operating through said guard upon the fruit positioned in said cells.

18. In a pitting machine, a disk shaped rotatable feed plate having a plurality of downwardly tapering fruit receiving cells therein and a guard substantially closing the upper ends of a plurality of said cells in combination with a member positioned above said guard and a pitting knife and plunger attached to said member in position to enter adjacent cells in said feed plate and operating through said guard upon the fruit positioned in said cells.

19. In a device of the kind described a cell plate provided with an opening therethrough and a guard positioned below and in close proximity to said cell plate comprising a rigid plate having a countersunk opening therethrough and a pad positioned below and attached to said rigid plate and having a slit registering with said opening and adapted to resiliently resist the passage of an article therethrough.

In testimony whereof, I have hereunto signed my name in the presence of two subscribing witnesses.

JASPER H. STANFIELD.

Witnesses:
 EMERIC A. HALLEY,
 OTTO A. BURANDT.